(12) United States Patent
Kesavan et al.

(10) Patent No.: US 9,594,914 B2
(45) Date of Patent: Mar. 14, 2017

(54) COLLECTING DATA FROM PROCESSOR-BASED DEVICES

(75) Inventors: Vijay Sarathi Kesavan, Hillsboro, OR (US); Xiangang Guo, Portland, OR (US); Victor B. Lortz, Beaverton, OR (US); Anand P. Rangarajan, Hillsboro, OR (US); Somya Rathi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 28 days.

(21) Appl. No.: 13/992,115

(22) PCT Filed: Mar. 30, 2012

(86) PCT No.: PCT/US2012/031508
§ 371 (c)(1),
(2), (4) Date: Oct. 9, 2013

(87) PCT Pub. No.: WO2013/147858
PCT Pub. Date: Oct. 3, 2013

(65) Prior Publication Data
US 2014/0033319 A1    Jan. 30, 2014

(51) Int. Cl.
*G06F 7/04* (2006.01)
*G06Q 10/00* (2012.01)
*G06F 21/60* (2013.01)
*G06Q 40/08* (2012.01)

(52) U.S. Cl.
CPC .............. *G06F 21/60* (2013.01); *G06Q 10/00* (2013.01); *G06Q 40/08* (2013.01)

(58) Field of Classification Search
CPC .................................. G06F 7/00; G06F 21/60
USPC ............... 726/1, 22, 23, 24, 25, 26; 705/1, 7
See application file for complete search history.

(56) References Cited

U.S. PATENT DOCUMENTS

| | | | |
|---|---|---|---|
| 7,257,844 B2 * | 8/2007 | Woodward | H04L 9/085 380/231 |
| 7,484,008 B1 | 1/2009 | Gelvin et al. | |
| 7,668,736 B2 | 2/2010 | Jones | |
| 8,090,598 B2 | 1/2012 | Bauer | |
| 8,477,545 B2 * | 7/2013 | Jin | G11C 7/00 365/191 |
| 8,977,284 B2 * | 3/2015 | Reed | H04W 64/006 455/404.2 |
| 2004/0153362 A1 | 8/2004 | Bauer | |

(Continued)

FOREIGN PATENT DOCUMENTS

CN         102265118 A        11/2011

OTHER PUBLICATIONS

PCT International Search Report and Written Opinion issued in corresponding PCT/US2012/031508 dated Nov. 23, 2012, (12 pages).

(Continued)

*Primary Examiner* — Abu Sholeman
(74) *Attorney, Agent, or Firm* — Trop Pruner & Hu, P.C.

(57) ABSTRACT

In accordance with some embodiments, information may be collected from processor-based devices after the processor-based devices have already been deployed. Moreover, in some cases, the information that is to be collected, the collection sources, and the handling of the data may be specified after the processor-based devices have already been deployed.

23 Claims, 3 Drawing Sheets

(56) References Cited

U.S. PATENT DOCUMENTS

| | | | |
|---|---|---|---|
| 2005/0075144 A1* | 4/2005 | Muramatsu | B60R 25/24 455/569.2 |
| 2006/0089145 A1* | 4/2006 | Chen | G08G 1/096716 455/445 |
| 2010/0057479 A1* | 3/2010 | De | G06Q 10/20 705/305 |
| 2010/0274631 A1* | 10/2010 | McFall | G06Q 30/0203 705/7.32 |
| 2012/0243687 A1* | 9/2012 | Li | H04L 9/085 380/277 |
| 2012/0245992 A1* | 9/2012 | Pender et al. | 705/14.27 |
| 2013/0046559 A1* | 2/2013 | Coleman et al. | 705/4 |
| 2014/0040992 A1* | 2/2014 | Koide et al. | 726/4 |

OTHER PUBLICATIONS

China Patent Office issued CN office action in corresponding CN patent application No. 04-05-2016 (7 pages) [No translation].

* cited by examiner

COLLECTING DATA FROM PROCESSOR-BASED DEVICES

BACKGROUND

This relates generally to computer systems which, broadly, may be described as processor-based devices. Particularly, it relates to collecting information remotely from one or more processor-based devices.

As used herein, a processor-based device is any device that includes a processor or controller, including a computer, a smartphone, a television with a processor or controller, an entertainment system, or a media playback device, to mention some examples.

BRIEF DESCRIPTION OF THE DRAWINGS

Some embodiments are described with respect to the following figures.

DETAILED DESCRIPTION

In accordance with some embodiments, information may be collected from processor-based devices after the processor-based devices have already been deployed. Moreover, in some cases, the information that is to be collected, the collection sources, and the handling of the data may be specified after the processor-based devices have already been deployed.

Figure 1:
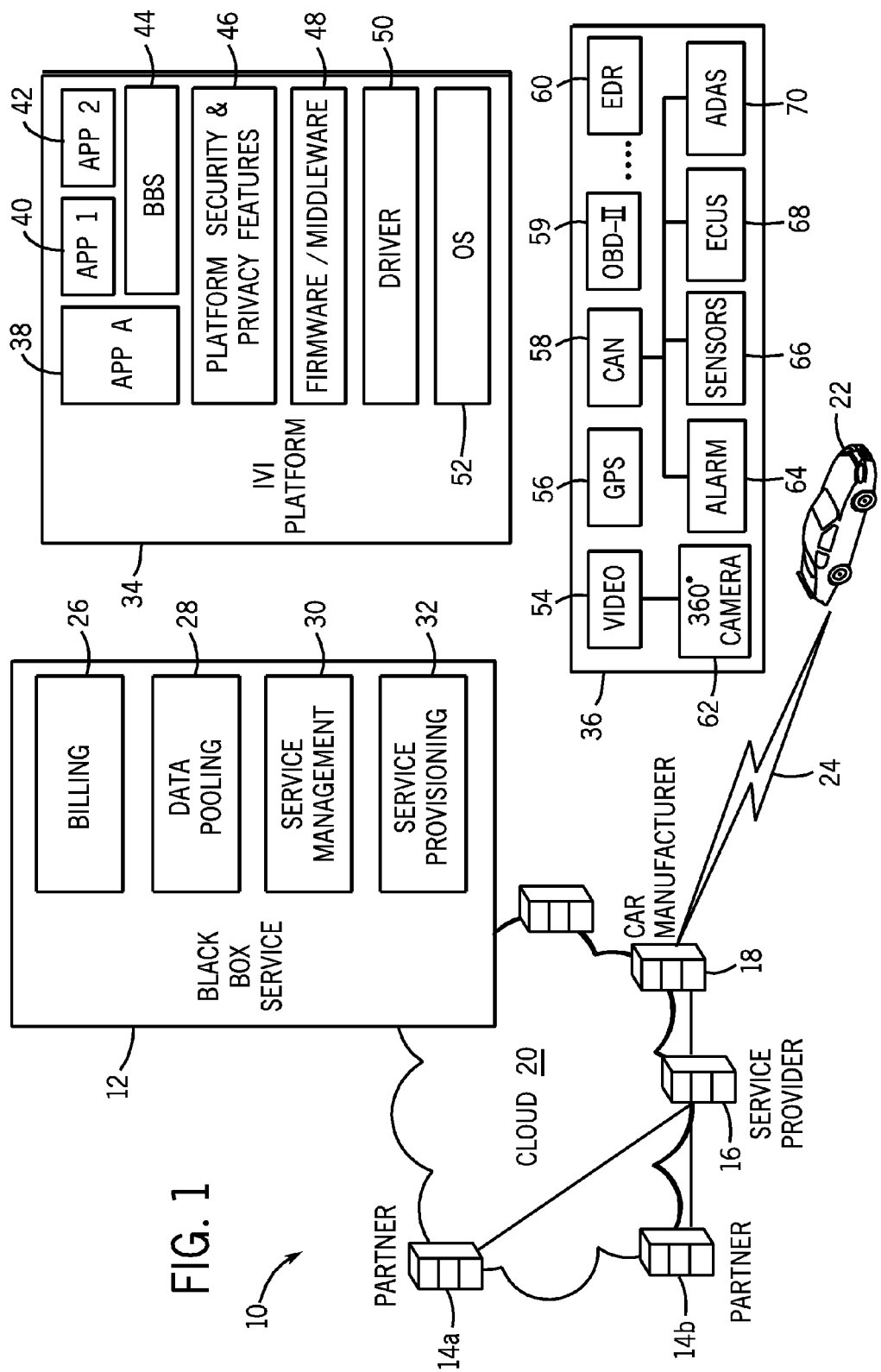
FIG. 1 is a high level depiction of one embodiment of the present invention.

Referring to FIG. 1, an embodiment using a vehicle based processor-based device is depicted. However, the present invention is not limited to vehicle based applications and can apply to any processor-based device in general, including smartphones, laptop computers, desktop computers, televisions, entertainment systems, and media playback devices, to mention some examples.

The system 10 may include a cloud or server 20 that allows communication between a number of entities. In this example, two partners 14a and 14b are depicted. The partners may be cloud or server connected entities who arrange with a service provider 16 to collect information of interest on demand from a group of processor-based devices. Thus, in one example, the processor-based devices may be in vehicles made by one or more vehicle manufacturers 18. Thus, the service provider may coordinate between the partners wanting the information, such as the partners 14a and 14b, and vehicles 22 made by a given car manufacturer 18.

The car manufacturer may be involved because the car manufacturer has the information about how information may be accessed from a processor-based device in a vehicle 22 over a wireless link 24. In some embodiments, aftermarket device may be pre-installed with an application through a service provider. In this scenario the car manufacturer need not be involved in the system.

In some embodiments, the wireless link 24 may be cellular radio based and, in other embodiments, it may be satellite based. Other communication technologies may also be used including Wi-Max and WiFi.

Also coupled to the cloud 20 may be a black box service 12 that provides overall administrative support for the data collection process. Thus, the black box service 12 may include a billing module 26, responsible for billing the partners 14, a data pooling module 28 for accepting and validating data from individual vehicle and pooling and aggregating data across a large number of vehicles 22 to satisfy the requests of a given partner 14, a service management module 30 to implement the collection of data including handling service maintenance and upgrades, and a service provisioning module 32 that is responsible for configuring, enabling the service for data collecting from the vehicle 22.

Each vehicle 22 may have a sensor module 36. It may include a video source 54, such as a video camera 62 adopted to capture video of a scene outside the vehicle. It may include a global positioning system 56 to indicate vehicle position. Also provided may be a connection to a controller area network (CAN) bus 58, an on-board diagnostics interface (OBD-II) 59 and an electronic data recorder (EDR) 60. The CAN bus 58 is event driven and each message is provided with an identifier as to its source or type. Other identification modalities can also be used, independent of those provided by the CAN bus. The sensor module 34 may collect various information such as current time, global positioning system coordinates, as well as other information from the CAN bus 58 such as odometer sensor data, speedometer data and other such information. The CAN bus 58 is also connected to the vehicle engine computer units (ECUS) 68. The module data may be buffered in some embodiments and transferred periodically or upon event detection to the platform 34.

In some embodiments data collection may be triggered by an event. For example, an alarm may issue an alarm in response to an unusual situation and in response, data may be collected. For example when a sudden acceleration is sensed, data collection may be triggered.

Thus in some embodiments, the provision of a buffer allows automatic provision of data collected during a predetermined amount of time before the triggering event. In addition data after the event may be automatically collected. Thus in some embodiments, the amount of pre-event data may be determined by the size of the buffer and the amount of post-event data, that is provided may be determined by programmed time limitations.

The CAN bus 58 may, in some embodiments, be coupled to a vehicle alarm 64, various sensors 66, ECUs 68, and Advanced Driver Assistance Systems (ADAS) 70. Other arrangements are also contemplated. The idea here is that, in some embodiments, the CAN bus 58 or the OBD-II interface may be used because it is an existing bus in many vehicles coupled to existing vehicle sensors. So the CAN bus can be used to collect a large amount of data which may be of interest to partners 14, in particular circumstances.

In some embodiments, the vehicle 22 may include an in-vehicle infotainment (IVI) platform 34. That platform may include applications 38, 40, and 42, the black box service 44 that works with the black box service 12 in the cloud 20, platform security and privacy features 46, firmware and middleware 48, drivers 50, and an operating system 52.

Figure 2:
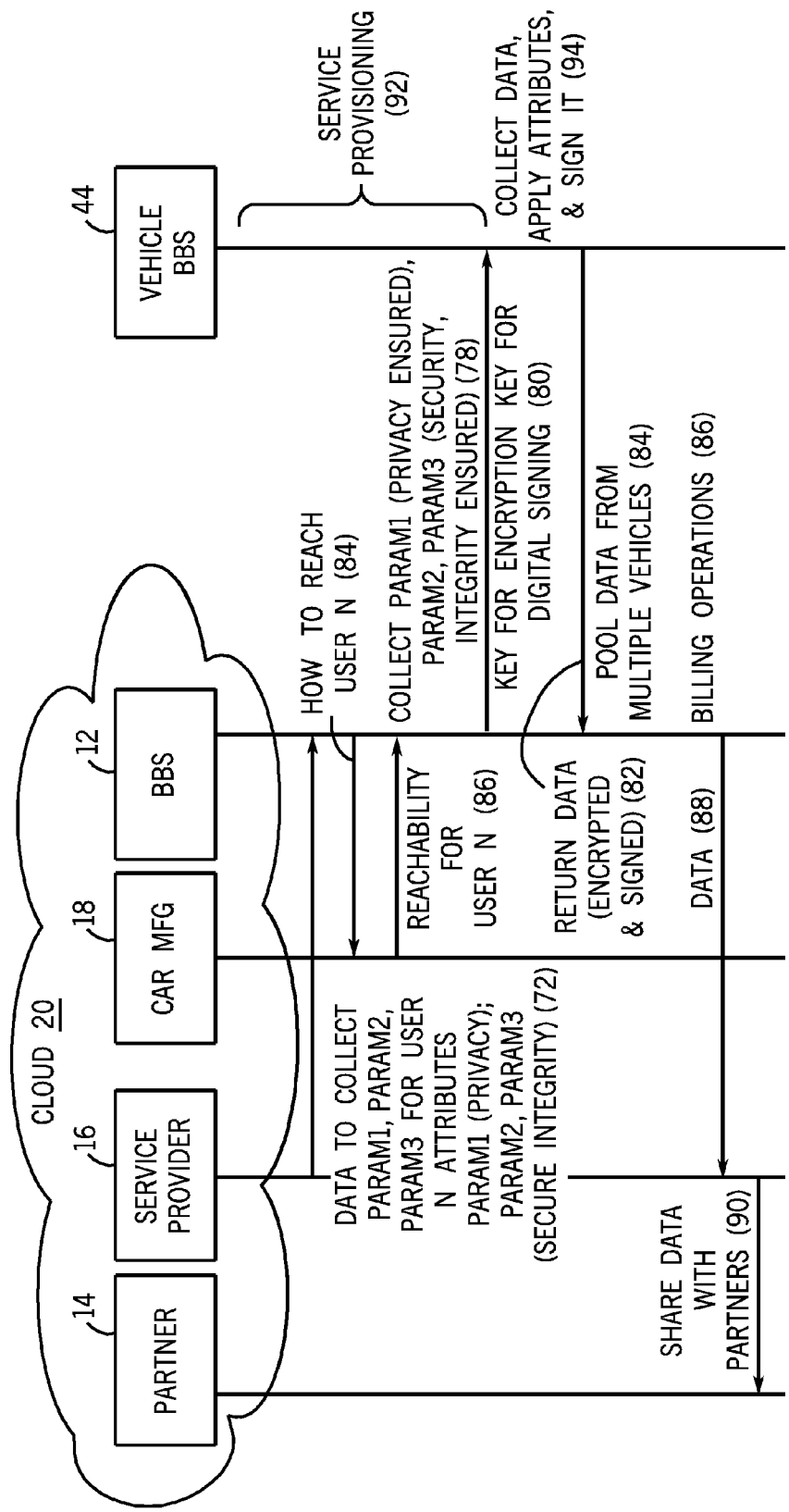
FIG. 2 is a chart depicting the operations of various of the entities shown in FIG. 1 in accordance with one embodiment.

The operation of the system 10, shown in FIG. 1, is further illustrated in FIG. 2, which shows a sequence of operations, in one embodiment, of the various entities shown in FIG. 1. For example, a partner 14 may receive data from a service provider 16, as indicated by arrow 90. The service provider 16 may specify to the black box service 12, the data to collect in response to an inquiry from a partner 14 as indicated by arrow 72. That data to collect may be specified by one or more parameters, such as param1, param2, and param3 for particular user N. Thus, the data to collect may be specified on a user-by-user basis where the user, in one embodiment, is the vehicle 22 driver, owner or leasor. The service provider 16 may also specify various parameter attributes, including a privacy parameter, param1, and parameters param 2 and param 3 for specifying data security and integrity.

The specification of data to collect may be provided to the black box service 12 in the cloud with an inquiry about how one or more users N may be contacted to collect the data. The black box service 12 in the cloud may then contact one or more car manufacturers 18 to obtain this information as indicated by arrow 84. The car manufacturer 18, who provided the vehicle black box service module 44 in the platform within the vehicle, may respond with the information about how to collect the information and to contact the particular vehicle, as indicated at 86.

In another embodiment, the car manufacturer may not be involved. For example, the vehicle BBS may periodically report its reachability information to the cloud BBS. In yet another embodiment, a wireless carrier may provide the reachability information.

The black box service 12 actually contacts the vehicle 22, specifying the parameters and their attributes to the vehicle black box service 44, as indicated at 78. The service provisioning then takes place within the vehicle black box service 44, as indicated at 92. This may involve collecting the respective information from storage within the vehicle or collecting the requested information over a given time period from the various sensors within the module 36.

The black box service 12 may also provide a key for encryption and a key for digital signing, as indicated at block 80, to the vehicle black box service 44. The black box service 44 then collects the data, applies the specified attributes and signs the data using the key for digital signing, as indicated at 94. Next the data is returned in an encrypted and signed format, as indicated at arrow 82. The signing and encryption may have been specified in the parameters provided from the partner to the service provider to the black box service 12 and, ultimately, to the vehicle black box service 44.

The black box service in the cloud may then pool the data from multiple vehicles, as indicated at block 84. It may also implement billing procedures, as indicated at 86. Finally, the black box service 12 provides the data, as indicated at 88, to the service provider 16. The service provider 16 then distributes the data to the appropriate partners, as indicated by arrow 90.

Figure 3:
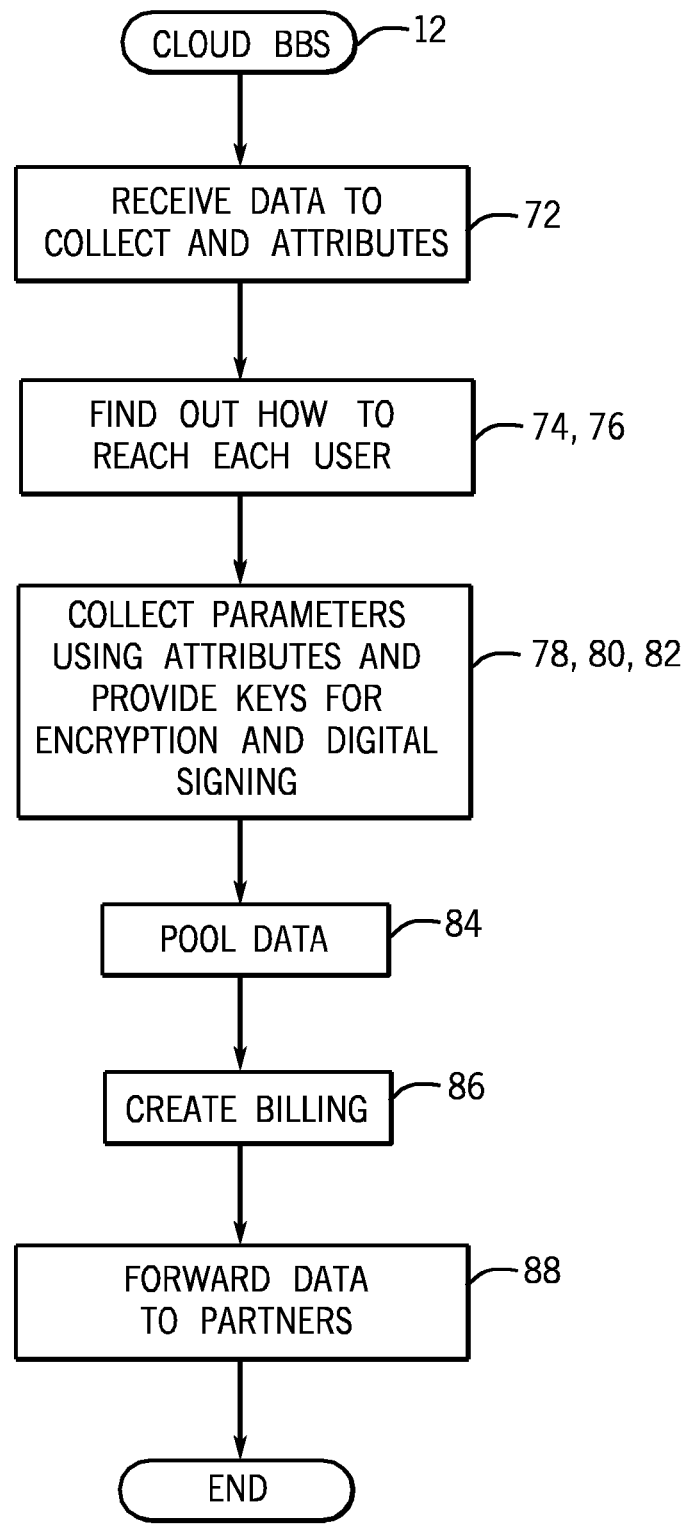
FIG. 3 is a flow chart for the cloud shown in FIG. 1 and FIG. 2 in accordance with some embodiments.

Thus, a sequence for the cloud black box service 12, shown in FIG. 3, may be implemented in software, firmware, and/or hardware. In software and firmware embodiments, it may be implemented by computer executed instructions stored in one or more non-transitory computer readable media, such as a magnetic, semiconductor, or optical storage.

In one embodiment, the sequence 12 begins by receiving, from the service provider, a specification of data to collect and security, integrity, and privacy attributes for that data, as indicated in block 72. Then, the cloud black box service 12 finds out how to reach each of the users whose data is required, as indicated in blocks 74, 76. Next, the parameters of interest and their attributes are collected and the keys for encryption and digital signing as specified may be provided to the vehicle black box service 44, as indicated in blocks 78, 80, and 82. Data pooling may occur at block 84 and billing may be created at block 86. The data is then forwarded to the appropriate partners, as indicated in block 88.

Other applications beyond the in-car vehicle system may include remote mining of information from smartphones, computers, televisions, appliances, to mention some examples. For example, Internet browsing activities may be mined and provided to service providers under similar circumstances. Likewise, information about users' activities on any processor-based device may be mined and used for social networking applications. Television viewing habits and other information may be mined to determine which television programs are being watched and how those television programs are being watched in terms of channel switching, which may be of interest to advertisers, as well as for social networking applications.

As an example of an application for an in-vehicle computer system, a service provider may be a state department of transportation authorized agency. In order to determine a number of miles driven by each vehicle owner in the state, the starting, intermediate, and ending locations for each trip may be extracted from vehicles used by persons within that state. The specification of the data of interest may include specifications that the data is accurate and tamper free.

Vehicle location information may be used to determine whether the road used is public or private. If a vehicle includes a navigation system that is unable to make this determination, the information sent to the cloud may enable the determination to be made remotely. However, from the end-user's perspective, the entity making the determination need not have access to the driver's identity. Thus, the black box system may anonymize the identity of the vehicle owner and send trip information without specifying a particular vehicle owner. This may satisfy vehicle owner privacy concerns.

After the type of road is determined, the information may be sent to the cloud black box service that maintains a cumulative record of the number of miles driven on public roads and reporting it to a partner in the form of the state department of transportation.

As another example, various insurance coverages may implemented, dependent on the mining of data from a vehicle. When a new user signs up with an insurance company, who acts as the service provider, the insurance company may use the black box service to provision the collecting of usage-based insurance (UBI) data (location, speed, sudden acceleration, sudden breaking etc) and crash data (location, speed, point of impact, photos/videos etc). The cloud black box service may specify the parameters that are to be collected for the UBI/crash monitoring.

Keys to encrypt the UBI data and crash data may be sent to the vehicle black box service. The key for signing the data may also be sent to the vehicle black box service.

The vehicle then gathers the UBI/crash data using platform features, encrypts the data using the cloud provision keys, and signs the data before sending it to the cloud black box service for billing and the insurance company.

In the case of a crash, the insurance company can share the signed data with their partners who offer other services, such as roadside assistance or with other insurance companies for claim processing.

In the case of litigation, the signed data can be shared with the courts.

In one embodiment, when a customer signs up with the insurance company, the company may send the information to the cloud black box service. The cloud black box service, during the service provisioning process, specifies the data to be collected. For example, an event data recording for crash monitoring may be indicated and the parameters needed for UBI may be indicated.

The cloud black box service sends this information to the vehicle resident black box service, along with keys to encrypt and keys to sign the data. The device black box service interfaces with a black box driver to provision that data parameters be collected in the events that trigger data collection. In one embodiment, for crash monitoring, the event will be an alarm event and for UBI data, it may be collected periodically. The black box driver provisions the keys for encryption and signing in the secure element. In case of a crash, an alarm is generated and the black box driver programs the EDR and other peripherals in a secure mode during which data from them is sent securely to a secured element that encrypts and signs the data using keys that the cloud black box service provides.

In the case of UBI, the black box driver programs the CAN/OBD-II and other peripherals in the secure mode and, as described above in connection with the crash embodiment, the data may be encrypted and signed. The data may then be sent to the service provider. In the case of a crash, the service provider can share the signed EDR data with other insurance companies for claim processing. Those insurance companies can verify that the data is secure and tamper proof by checking the signature of the signed data with the black box service.

The following clauses and/or examples pertain to further embodiments:

1. A method comprising:
   receiving a specification from a requesting entity of a selected processor-based device from which to collect data;
   receiving a specification of data to collect from the selected processor-based device;
   receiving a specification of a privacy or security parameter for the data; obtaining information about how to access the selected device;
   collecting the data from the device; and
   providing the data to the requesting entity, using the specified security or privacy parameter.
2. The method of clause 2 including receiving a key for encryption for digital signing.
3. The method of clause 2 including collecting the data with the privacy or security parameter and using the key to encrypt the data.
4. The method of clause 1 including receiving a request for information about how to contact the processor-based device.
5. The method of clause 4 including contacting the manufacturer of the processor-based device to determine how to contact the processor-based device.
6. The method of clause 1 including pulling data from multiple processor-based devices and providing the pooled data to the requesting entity.
7. The method of clause 1 including creating billing for the data collection.
8. The method of clause 1 including collecting data from a device in a vehicle.
9. A method comprising:
   accessing a source to obtain a link to reachability information for an in-vehicle information system;
   collecting information from said system; and
   providing the information to third parties by applying specified privacy safeguards.
10. The method of clause 9 including obtaining the link from a vehicle manufacturer.
11. The method of clause 9 including obtaining the link from a service provider.
12. The method of clause 9 including obtaining information from a plurality of processor based devices, pooling said information and providing the pooled information to the third party.
13. The method of clause 9 including obtaining and applying different privacy parameters for different data and applying the correct parameters to different data.
14. The method of clause 13 including selecting an encryption technique based on said privacy parameter.
15. The method of clause 14 including collecting information about how the user operates the vehicle.
16. The method of clause 14 including collecting information about a vehicular crash.
17. The method of clause 14 including collecting information about operation of a vehicle in a particular geographic locale.
18. At least one computer readable medium storing instructions that in response to being executed on a computing device cause the computing device to carry out a method according to any one of clauses 1 to 17.
19. An apparatus to perform the method of any one of clauses 1 to 17.
20. The apparatus of clause 19 wherein said apparatus is a vehicular computer system.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A method comprising:
   accessing a first entity to obtain a link to access information including first and second data from an in-vehicle infotainment system;
   collecting the first and second data from said system in a second entity using the access information;
   protecting the first data using encryption specified by a third entity;
   protecting the second data using encryption specified by a fourth entity;
   sending the first data after encryption to the third entity; and
   sending the second data after encryption to the fourth entity;
   enabling certain data to be separately accessed and viewed by one of the two entities but not by the other entity; and
   obtaining information from a plurality of processor based devices, pooling said information and providing the pooled information to the third entity.
2. The method of claim 1 including obtaining the link from a vehicle manufacturer.

3. The method of claim 1 including obtaining the link from a service provider.

4. The method of claim 1 including selecting an encryption technique based on said privacy parameter.

5. The method of claim 4 including collecting information about how the user operates the vehicle.

6. The method of claim 4 including collecting information about a vehicular crash.

7. The method of claim 4 including collecting information about operation of a vehicle in a particular geographic locale.

8. One or more non-transitory computer readable media storing instructions to perform a sequence comprising:
   accessing a first entity to obtain a link to access information including first and second data from an in-vehicle infotainment system;
   collecting the first and second data from said system in a second entity using the access information;
   protecting the second data using encryption specified by a third entity; and
   sending the first data after encryption to the third entity; and
   sending the second data after encryption to the fourth entity;
   enabling certain data to be separately accessed and viewed by one of the two entities but not by the other entity; and
   obtaining information from a plurality of processor based devices, pooling said information and providing the pooled information to the third entity.

9. The media of claim 8, further storing instructions to perform a sequence including obtaining the link from a vehicle manufacturer.

10. The media of claim 8, further storing instructions to perform a sequence including obtaining the link from a service provider.

11. The media of claim 8, further storing instructions to perform a sequence including obtaining information from a plurality of processor based devices, pooling said information and providing the pooled information to the third party.

12. The media of claim 8, further storing instructions to perform a sequence including selecting an encryption technique based on said privacy parameter.

13. The media of claim 12, further storing instructions to perform a sequence including collecting information about how the user operates the vehicle.

14. The media of claim 12, further storing instructions to perform a sequence including collecting information about a vehicular crash.

15. The media of claim 12, further storing instructions to perform a sequence including collecting information about operation of a vehicle in a particular geographic locale.

16. An apparatus comprising:
   a processor to access a first entity to obtain a link to access information including first and second data from an in-vehicle infotainment system, collect the first and second data from said system in a second entity using the access information, protect the first data using encryption specified by a third entity, protect the second data using encryption specified by a fourth entity, and, send the first data after encryption to the third entity, send the encrypted second data after encryption to the fourth entity, enable certain data can be separately accessed and viewed by one of the two entities but not by the other entity, and obtain information from a plurality of processor based devices, pool said information and provide the pooled information to the third entity; and
   a memory coupled to said processor.

17. The apparatus of claim 16, said processor to obtain the link from a vehicle manufacturer.

18. The apparatus of claim 16, said processor to obtain the link from a service provider.

19. The apparatus of claim 16, said processor to obtain information from a plurality of processor based devices, pooling said information and providing the pooled information to the third party.

20. The apparatus of claim 16, said processor to select an encryption technique based on said privacy parameter.

21. The apparatus of claim 20, said processor to collect information about how the user operates the vehicle.

22. The apparatus of claim 20, said processor to collect information about a vehicular crash.

23. The apparatus of claim 20, said processor to collect information about operation of a vehicle in a particular geographic locale.

* * * * *